No. 11,750.
Reissued June 13, 1899.
F. MEISEL.
MACHINE FOR CUTTING PAPER FROM WEBS INTO SHEETS.
(Application filed Apr. 19, 1899.)
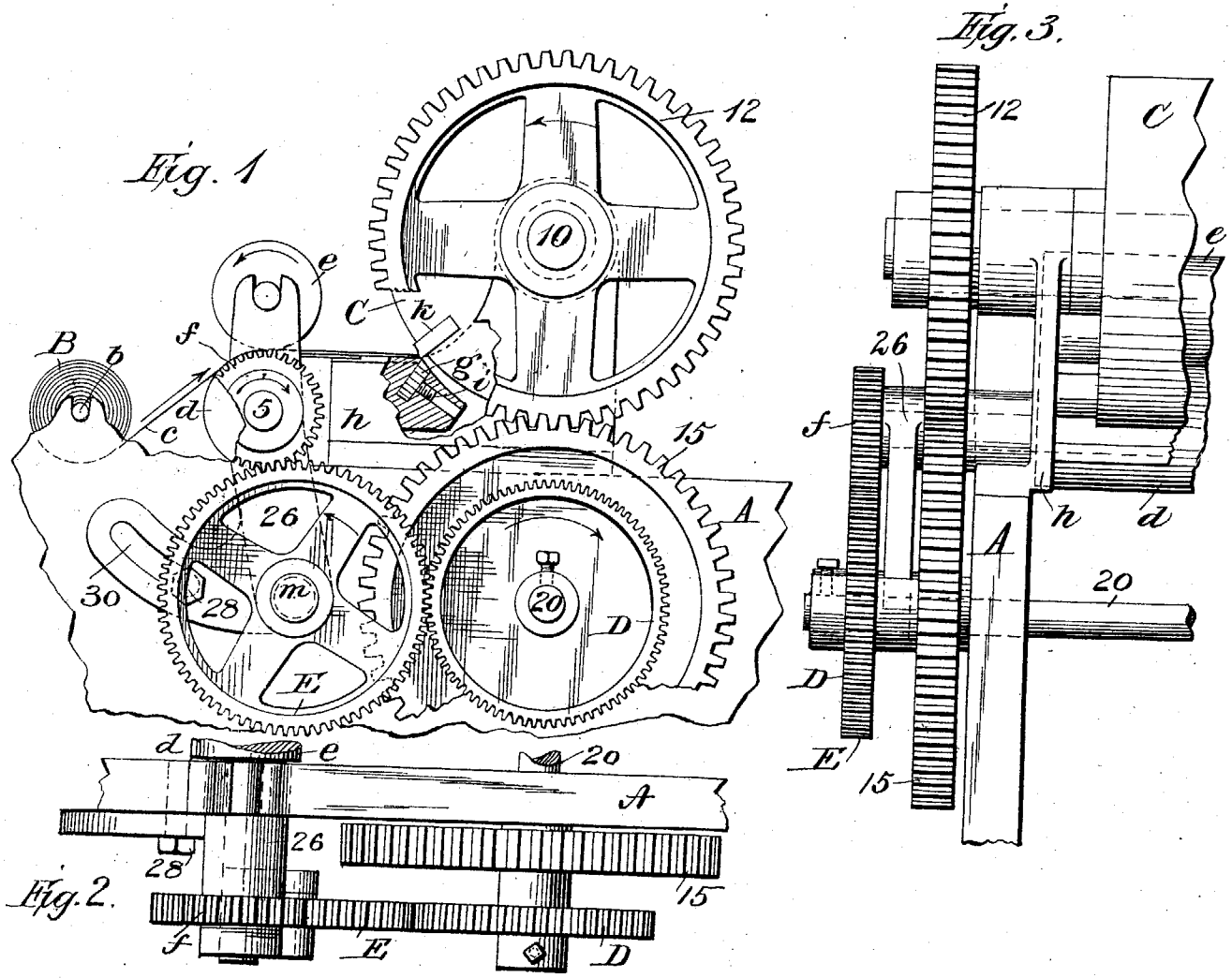
Witnesses
Franck L. Durand
Albert K. Williams Jr.
Inventor.
Francis Meisel.
by P.E. Teschemacher & Geo. H. Fraser
his Attorney

UNITED STATES PATENT OFFICE.

FRANCIS MEISEL, OF BOSTON, MASSACHUSETTS.

MACHINE FOR CUTTING PAPER FROM WEBS INTO SHEETS.

SPECIFICATION forming part of Reissued Letters Patent No. 11,750, dated June 13, 1899.

Original No. 601,200, dated March 22, 1898. Application for reissue filed April 19, 1899. Serial No. 713,671.

*To all whom it may concern:*

Be it known that I, FRANCIS MEISEL, a citizen of the United States, residing at Boston, in the county of Suffolk and State of Massachusetts, have invented an Improvement in Machines for Cutting Paper from the Web into Sheets, of which the following is a full, clear, and exact description, reference being had to the accompanying drawings, making part of this specification, in which—

Figure 1 is a side elevation of a portion of a paper-cutting machine embodying my invention. Fig. 2 is a plan of the same, the cutter-head and its gear being removed. Fig. 3 is an end elevation of the same.

My invention has for its object to provide a paper-cutting machine in which a web can be cut into sheets varying in length by predetermined fractional parts of inches—that is to say, the sheet may be cut into "stock lengths" or the sizes usually carried in stock by paper-dealers; and to this end my invention consists in a machine of this character embodying certain novel features of construction, whereby the desired end is accomplished in a more reliable and effective manner than heretofore.

In the said drawings, A represents the framework of the machine, in suitable bearings in which is journaled the shaft *b* of the roll B, from which is drawn the web *c* of paper to be cut into sheets, said web being unwound from the roll B by a pair of feed-rolls *d e*, the shaft 5 of the roll *d* carrying a gear *f*, which is driven by a train of gears, to be hereinafter described, receiving motion from any suitable source of power.

*g* is a stationary cutter-blade or knife made adjustable in a stock or support *h* by means of a screw *i*, and *k* is a rotary cutter-blade or knife coöperating with the stationary knife *g* and secured to a cylinder C, the axis of which is parallel with the edge of the stationary blade *g*, the paper being cut into sheets of uniform length as it passes between the said cutters.

To the shaft 10 of the cylinder C is secured a gear 12, which meshes with and is driven by a gear 15 of the same size on a shaft 20, suitably connected with the driving-shaft of the machine.

D is a change-wheel which is removably secured to the shaft 20, and this wheel D meshes with an intermediate gear E, rotating on a stud *m*, mounted on a support 26, swinging on the shaft 5 of the lower feed-roll *d* and held in place when adjusted by a clamping-screw 28, passing through a slot 30, said feed-roll shaft carrying the gear *f*, which meshes with the intermediate gear E, whereby motion is transmitted from the gear 15, which drives the gear 12 and cutter-cylinder C, to the gear *f* on the shaft 5 of the lower feed-roll *d*, and thus by removing the change-wheel D and substituting another of different diameter the speed of the feed-rolls with relation to that of the cutter-cylinder can be varied as desired to change the length of the sheets cut from the web, and by this construction I am enabled to cut sheets of a great variety of different predetermined lengths, increasing, for instance, by uniform fractional parts of an inch from the shortest to the greatest length, said sheets at the same time having a clean smooth-edged or non-serrated cut.

As shown in the drawings, the gear 12, fastened to the shaft 10 of the cutter-cylinder C, meshes with the gear 15, which is of the same diameter as the gear 12, so that each revolution of the gear 15 produces a single revolution of the cutter-cylinder C and also of the change-gear D, secured to the shaft 20 of said gear 15.

The circumference of the feed-roll *d* is such that it can be equally divided into a certain number of quarter-inches. For instance, if the feed-roll *d* is twelve inches in circumference it could be divided into forty-eight longitudinal spaces each a quarter of an inch in length.

The gear *f*, fixed to the shaft 5 of the roll *d*, is provided with forty-eight teeth, while the change-gear D is provided with ninety-six teeth. Consequently a single revolution of the gear D will produce through the intermediate gear E two complete revolutions of the feed-roll *d*, thus feeding forward twenty-four inches of paper. Now if it is desired to feed forward twenty-three and three-quarter inches of paper at each revolution of the cutter-cylinder C it is merely necessary to remove the change-gear D and replace it by another gear having only ninety-five teeth, and, on the other hand, if it should be desired to feed forward a sheet twenty-four and one-quarter inches in length the gear D would be replaced by one having ninety-seven teeth, and in this manner the length of the sheet can be increased or diminished by quarters of an inch by the employment of a change-gear D having the required number of teeth—that is, a number of teeth equal to the number of quarters of an inch contained in the length of the sheet desired to be cut.

It will be obvious from the foregoing that if it should be desired to increase or diminish the length of the sheets cut by the cylinder C by eighths of an inch instead of by quarters of an inch this can be accomplished by doubling the number of teeth in each of the wheels *f* and D, the teeth of the intermediate gear E being made of the proper size to mesh with the teeth of the gears D and *f*.

What I claim as my invention, and desire to secure by Letters Patent, is—

1. In a paper-cutting machine, the combination with a cutting mechanism, of a pair of continuously-rotating feed-rolls, one of said rolls having a circumference divisible into predetermined equal fractional parts of inches as described, and provided with a gear having a number of teeth equal to the said predetermined number of equal fractional parts of inches contained in the circumference of said feed-roll; said feed-roll gear meshing with an intermediate gear driven by a change-wheel provided with the desired number of teeth to actuate the feed-roll at the required speed with relation to that of the cutting mechanism, substantially as and for the purpose specified.

2. In a paper-cutting machine, the combination with a continuously-rotating cutting-knife and a cutting-knife coacting therewith, of a pair of continuously-rotating feed-rolls, one of which has its circumference divisible into predetermined equal fractional parts of inches as described, and provided with a gear having a number of teeth equal to the said predetermined number of equal fractional parts of inches contained in the circumference of said feed-roll, said feed-roll gear meshing with an intermediate gear driven by a change-wheel provided with the desired number of teeth to actuate the feed-roll at the required speed with relation to that of the rotating cutting-knife substantially as and for the purpose specified.

3. In a paper-cutting machine, the combination with a stationary cutting-knife and a continuously-rotating cutting-knife, of a pair of continuously-rotating feed-rolls, one of said rolls having a circumference divisible into predetermined equal fractional parts of inches as described, and provided with a gear having a number of teeth equal to the said predetermined number of equal fractional parts of inches contained in the circumference of said feed-roll, said feed-roll gear meshing with an intermediate gear driven by a change-wheel provided with the desired number of teeth to actuate the feed-roll at the required speed with relation to that of the rotating cutting-knife, substantially as and for the purpose described.

4. A machine for cutting paper from the web into stock lengths, comprising a cutting mechanism having a continuously-rotating cutting-knife, a driving-shaft, gears of equal diameter connecting said shaft with the shaft of the rotary cutter, a pair of continuously-rotating feed-rolls one of which has its circumference divisible into predetermined equal fractional parts of inches, as quarter-inches, a gear on the shaft of said roll and having its teeth equal in number to the said number of equal fractional parts of inches contained in the circumference of said feed-roll, a change-wheel on said driving-shaft and having a number of teeth equal to the number of fractional parts of inches, as quarter-inches contained in the length of the sheet to be cut, and an adjustable gear connecting the change-gear with the said feed-roll gear, substantially as described.

Witness my hand this 10th day of April, A. D. 1899.

FRANCIS MEISEL.

In presence of—
P. E. TESCHEMACHER,
M. B. WILSON.